United States Patent [19]
Farnsworth

[11] Patent Number: 5,757,177
[45] Date of Patent: May 26, 1998

[54] INFRASONIC FREQUENCY RESONANT CIRCUIT AND METHOD FOR USE THEREOF

[75] Inventor: David F. Farnsworth, Forest Grove, Oreg.

[73] Assignee: OTW LLC, Paradise Valley, Ariz.

[21] Appl. No.: 424,407

[22] PCT Filed: Mar. 10, 1994

[86] PCT No.: PCT/US94/02630

§ 371 Date: Apr. 26, 1995

§ 102(e) Date: Apr. 26, 1995

[51] Int. Cl.$^6$ .................. G01V 3/12; G01V 1/00; H04B 11/00; H01Q 1/46
[52] U.S. Cl. .................. 324/72; 324/323; 324/344; 340/310.07; 340/601; 343/720; 455/270
[58] Field of Search .................. 324/72, 323, 334, 324/344, 345, 508, 509; 334/78; 340/310.01–310.08, 600, 601, 690; 343/720; 455/270

[56] References Cited

U.S. PATENT DOCUMENTS

| | | |
|---|---|---|
| 1,575,824 | 3/1926 | Eiffert . |
| 1,850,811 | 3/1932 | Selvig . |
| 1,922,335 | 8/1933 | Sobocinski . |
| 2,553,734 | 5/1951 | Adler . |
| 3,067,404 | 12/1962 | Hildebrandt . |
| 3,506,957 | 4/1970 | Davison . |
| 3,702,460 | 11/1972 | Blose .................. 340/310.07 X |
| 3,866,111 | 2/1975 | Warren . |
| 3,953,829 | 4/1976 | Boyle . |
| 4,064,480 | 12/1977 | Howlett . |
| 4,066,992 | 1/1978 | Buller et al. . |
| 4,124,841 | 11/1978 | Kettunen . |
| 4,132,947 | 1/1979 | Weischedel et al. . |
| 4,262,289 | 4/1981 | Rivera . |
| 4,358,757 | 11/1982 | Perini . |
| 4,433,326 | 2/1984 | Howell .................. 340/310.05 X |
| 4,612,506 | 9/1986 | Varotsos et al. . |
| 4,616,320 | 10/1986 | Kerr et al. . |
| 4,628,299 | 12/1986 | Tate et al. . |
| 4,657,025 | 4/1987 | Orlando . |
| 4,704,693 | 11/1987 | Thomas . |
| 4,724,390 | 2/1988 | Rauscher et al. . |
| 4,825,165 | 4/1989 | Helms et al. . |
| 4,837,582 | 6/1989 | Takahashi et al. . |
| 4,849,947 | 7/1989 | Baule et al. . |
| 4,884,030 | 11/1989 | Naville et al. . |
| 4,904,943 | 2/1990 | Takahashi . |
| 5,001,466 | 3/1991 | Orlinsky et al. . |
| 5,101,195 | 3/1992 | Caillat et al. . |
| 5,144,598 | 9/1992 | Engdahl et al. . |
| 5,148,110 | 9/1992 | Helms . |
| 5,151,838 | 9/1992 | Dockery . |
| 5,187,331 | 2/1993 | Sakata . |
| 5,256,974 | 10/1993 | Padden . |
| 5,278,512 | 1/1994 | Goldstein .................. 324/509 |
| 5,387,869 | 2/1995 | Enomoto . |

FOREIGN PATENT DOCUMENTS

| | | |
|---|---|---|
| 1536289 | 6/1967 | France . |
| 2019749 | 1/1969 | France . |
| 2122312 | 1/1971 | France . |

OTHER PUBLICATIONS

*Earthquakes*, Bruce A. Bolt, 1993, pp. 17–23, 45–47, 107, 127–130, 188–194, 202–206, 297–299, plus Glossary.

(List continued on next page.)

*Primary Examiner*—Gerard R. Strecker
*Attorney, Agent, or Firm*—Cahill, Sutton & Thomas P.L.C.

[57] ABSTRACT

An infrasonic frequency resonant circuit and method for use thereof. An electric power distribution system is employed both as antenna for ISF signals and as a source of inductive reactance for a resonant circuit tuned to a band within the ISF spectrum. A capacitor is placed from the neutral conductor to the ground conductor at an ac power outlet in a structure to form a resonant circuit ordinarily tuned to a band within the ISF spectrum. An ISF spectrum analyzer is connected to the neutral and ground terminals of the resonant circuit to visualize ISF electromagnetic signals induced on the electric power distribution system in both the frequency domain and the time domain and so as to be more readily evaluated.

22 Claims, 3 Drawing Sheets

OTHER PUBLICATIONS

*Quantitative Seismology*, Theory and Methods, vol. 1, Aki and Richards, 1980, pp. 525–533.

*Earthquake Prediction: Nine Major Earthquakes in China*, Ma Zongjin et al., 1990, pp. 105–111, 178, 180–182.

"MF–10 Universal Monolithic Dual Switched Capacitor Filter", *Data Acquisition Databook*, National Semiconductor Corp., Apr. 1992.

"Multi–Function Analog and Digital I/O Card", *Master Source Book*, Industrial Computer Source, 1994, p. 25.

"Single/Dual/Quad, 28MHZ, Low Noise, Low Voltage, Precision Op Amps", *Data Book vol. III*, Maxim, 1994, pp. 3–33 to 3–43.

*Vibration & Shock Sensor Selection Guide*, PCB Piezotronics, 1993, pp. cover page, 1, 42–43, 92–102, 104–105.

"Solion Infrasonic Microphone", *Journal of the Acoustical Society of America*, Collins et al., 1964, pp. 1283–1287.

"Infrasonics", *Ultrasonics*, 1969, pp. 30–35.

Correlation of Naturally Occurring Infrasonics and Selected Human Behavior, *Journal of the Acoustical Society of America*, Green and Dunn, 1968, pp. 1456–1457.

"Ein Beitrag zur Lautstärkemessung impulshaltiger Schalle", *Acustica*, von E. Zwicker, 1966, pp. 1–10.

"Field Measurement of Infrasonic Noise", *Acustica*, Hood and Leventhall, 1971, pp. 10–13.

"A Simple Frequency–Modulation Tape Recorder System", *Electronic Engineering*, Tempest and Bryan, 1967, pp. 87–89.

"Measurements of Infrasound from Artificial and Natural Sources," *Journal of Geophysical Research*, Fehr, 1967, pp. 2403–2417.

Effects of Low Frequency and Infrasonic Noise on Man, *Aerospace Medicine*, Mohr et al., 1965, pp. 817–824.

"The Effects of 'Föhn' Weather on Accident Rates in the City of Zurich (Switzerland)", *Aerospace Medicine*, Moos, 1964, pp. 643–645.

The Effects of 'Föhn' Weather on the Human Population of the Principality of Liechtenstein, *Aerospace Medicine*, Moos, 1963, pp. 736–739.

"Silent Sound Can Make You Nervous, Exhausted and Physically Ill", McCrindell, pre–1994, p. 1.

"The Silent Sound that Kills", *Science & Mechanics*, Dunning, 1968, pp. 31–33, pp. 75–76.

"The Acoustical Laser", pre–1994, pp. 9–11.

"What levels of infrasound are safe?", *New Scientist*, Brown, 1973, pp. 414–415.

"Can some people hear the jet stream?", *New Scientist*, Hanlon, 1973, pp. 415–416.

"Ultrasonic anti–theft devices—a new hazard?", *New Scientist*, Gable, 1973, p. 416.

"LM124 et seq. Low Power Quad Operational Amplifiers", *General Purpose Linear Devices Databook*, National Semiconductor Corp., 1989, 3–405 to 3–417.

INFRASONIC FREQUENCY RESONANT CIRCUIT AND METHOD FOR USE THEREOF

This application is a 371 of PCT/US94/02630, filed Mar. 10, 1994.

BACKGROUND OF THE INVENTION

This invention relates to resonant circuits, particularly to infrasonic frequency ("ISF") resonant circuits and the use thereof to receive ISF electromagnetic signals.

Receiving and identifying ISF electromagnetic signals has been found to be valuable in studying and evaluating various naturally occurring electromagnetic phenomena, as well as man made signals. As used herein, ISF refers to electromagnetic signals whose frequency is less than audio frequencies, that is, less than about 20 Hertz. "ISF" includes extremely low frequency ("ELF") and ultra extremely low frequency ("UELF") signals to the extent those terms are used to refer to frequencies below about 20 Hertz. One emerging, particularly valuable application for receiving and evaluating ISF signals is to identify electromagnetic energy produced by tectonic activity which has been found to precede the occurrence of earthquakes. This is proposed, for example, in Takahashi U.S. Pat. No. 4,837,582, Naville et al. U.S. Pat. No. 4,884,030, and Takahashi U.S. Pat. No. 4,904,943.

It is well known that resonant circuits are employed in radio receivers to tune the receiver to a particular frequency. The resonant frequency of a simple parallel inductor-capacitor-resistor ("LRC") resonant circuit is given by the following equation:

$$f = \frac{1}{2\pi \sqrt{LC}}$$

where f=frequency in Hertz ("Hz"), L=inductance in Henrys ("H"), C=capacitance in Farads ("F"), and n=3.14.

It has previously been recognized that an ac power line can be used as an antenna for high frequency radio signals. For example, Adler U.S. Pat. No. 2,553,734 and Hughes et al. U.S. Pat. No. 3,142,064 propose various circuits for coupling television signals on a power line to a television receiver.

It has now been recognized by the inventor herein that ISF electromagnetic energy produced by tectonic activity preceding earthquakes induces ISF signals on the power line and that an electric power distribution system, of which a power line is a part, makes an especially good ISF antenna. However, none of the circuits proposed in the aforementioned patents is suitable for receiving ISF signals induced on a power distribution system. Consequently, there is a need for an improved circuit for coupling ISF signals from an electric power distribution system to a device for identifying those signals.

Further, prior known methods of receiving electromagnetic signals associated with tectonic activity have ordinarily employed specialized pick-up devices or subterranean or submarine antennas to receive the electromagnetic energy. Such devices and antennas are inconvenient to use and have undesireably limited useful range due to their small size relative to the wavelengths of ISF signals.

In addition, while attempts have been made to receive and interpret ISF signals associated with tectonic activity, no system or method appears to have been known which presents information regarding these signals in a manner suitable for adequate understanding of the nature of the tectonic activity.

Accordingly, there is a need for a better method and system for receiving and evaluating ISF electromagnetic signals, particularly those associated with tectonic activity.

SUMMARY OF THE INVENTION

The present invention solves the aforementioned need for a better method and system for receiving and evaluating ISF electromagnetic signals by employing an electric power distribution system both as an antenna for ISF signals and as a source of inductive reactance for a resonant circuit tuned to a band within the ISF spectrum. Evaluation of ISF signals, particularly those associated with tectonic activity, has been improved by using a spectrum analyzer connected to the resonant circuit to visualize the ISF signals in both the time domain and the frequency domain.

It has been found that, by placing a capacitor from the neutral conductor to the ground conductor at an ac power outlet in a structure, a resonant circuit ordinarily can be formed which can be tuned to a band within the ISF spectrum. It has also been found that, by connecting the input of an ISF spectrum analyzer to the neutral and ground terminals of that resonant circuit, ISF electromagnetic signals induced on the electric power distribution system can be visualized in both the frequency domain and the time domain and thereby more readily evaluated.

Generally in the subject invention, an electric conductor forms a conductive path adjacent the surface of the earth. The conductor is terminated at one end with respect to earth ground. A reactive element is coupled to the conductor at a location spaced from the one end. The reactive element, together with the distributed inductances, capacitances and resistances of the conductor and the earth, produces a resonant frequency at a selected ISF. Preferably, the conductor is an installed electric power distribution system service drop and is coupled to the reactive element by an electric power cable within a structure, the reactive element being connected from the neutral conductor to the ground conductor of the power cable at an ac power outlet. The electric power distribution system provides sufficient inductance to make the circuit resonant to ISF signal.

Thence, ISF signals induced on an electric power distribution system are coupled to a device for identifying those signals by integrating an ISF resonant circuit into the power distribution system, such that the power transformer disposed between a power distribution line and a service drop serves to couple ISF signals from the power distribution system to the resonant circuit. The power transformer also serves as a low pass filter to attenuate higher frequency signals.

Therefore, it is a principal object of the present invention to provide a novel and improved ISF resonant circuit and method for use thereof.

It is also a principal object of the present invention to provide a novel and improved circuit for coupling ISF signals induced on a power distribution system to a device for identifying those signals and a method for such coupling.

It is a further object of the present invention to provide an ISF resonant circuit that employs the impedance present in a power distribution system as an impedance element in a resonant circuit.

It is yet another object of the present invention to employ a conductive element of an installed utility system to form part of an ISF resonant circuit.

It is yet a further object of the present invention to employ an electric power distribution system as an antenna to receive ISF electromagnetic signals.

It is still another object of the present invention to provide a circuit for coupling ISF signals induced on an electric power distribution system to a device for identifying such signals.

It is still a further object of the present invention to provide an apparatus and method for employing an electric power distribution system to receive electromagnetic signals generated by tectonic activity.

It is a further object of the present invention to provide a novel and improved system and method for receiving, identifying and evaluating ISF electromagnetic signals.

The foregoing and other objects, features and advantages of the invention will be more readily understood upon consideration of the following detailed description of the invention, taken in conjunction with the accompanying drawings.

DESCRIPTION OF THE PREFERRED EMBODIMENT

Figure 1:
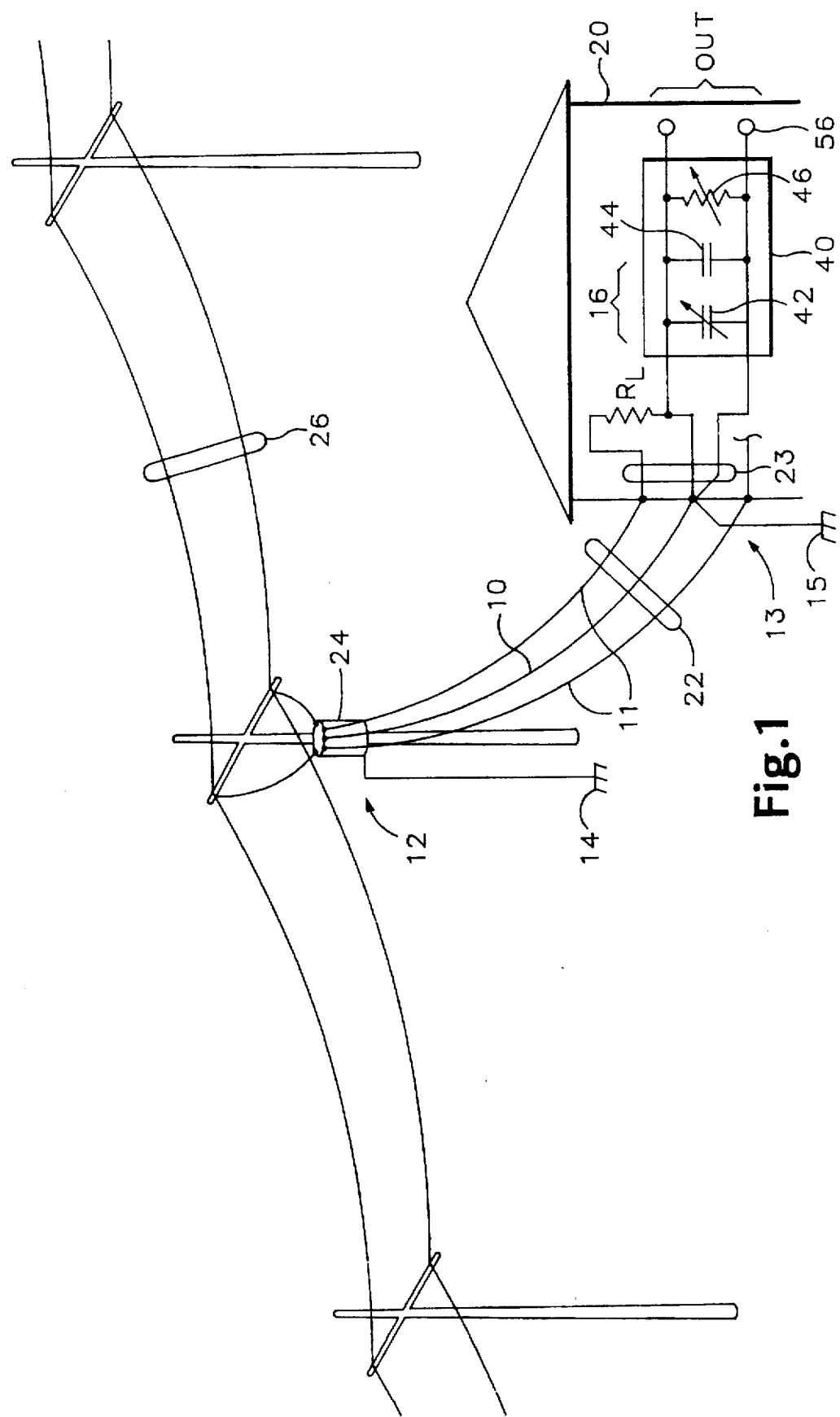
FIG. 1 is a schematic diagram of a typical installation of a resonant circuit according to the present invention.
Figure 2:
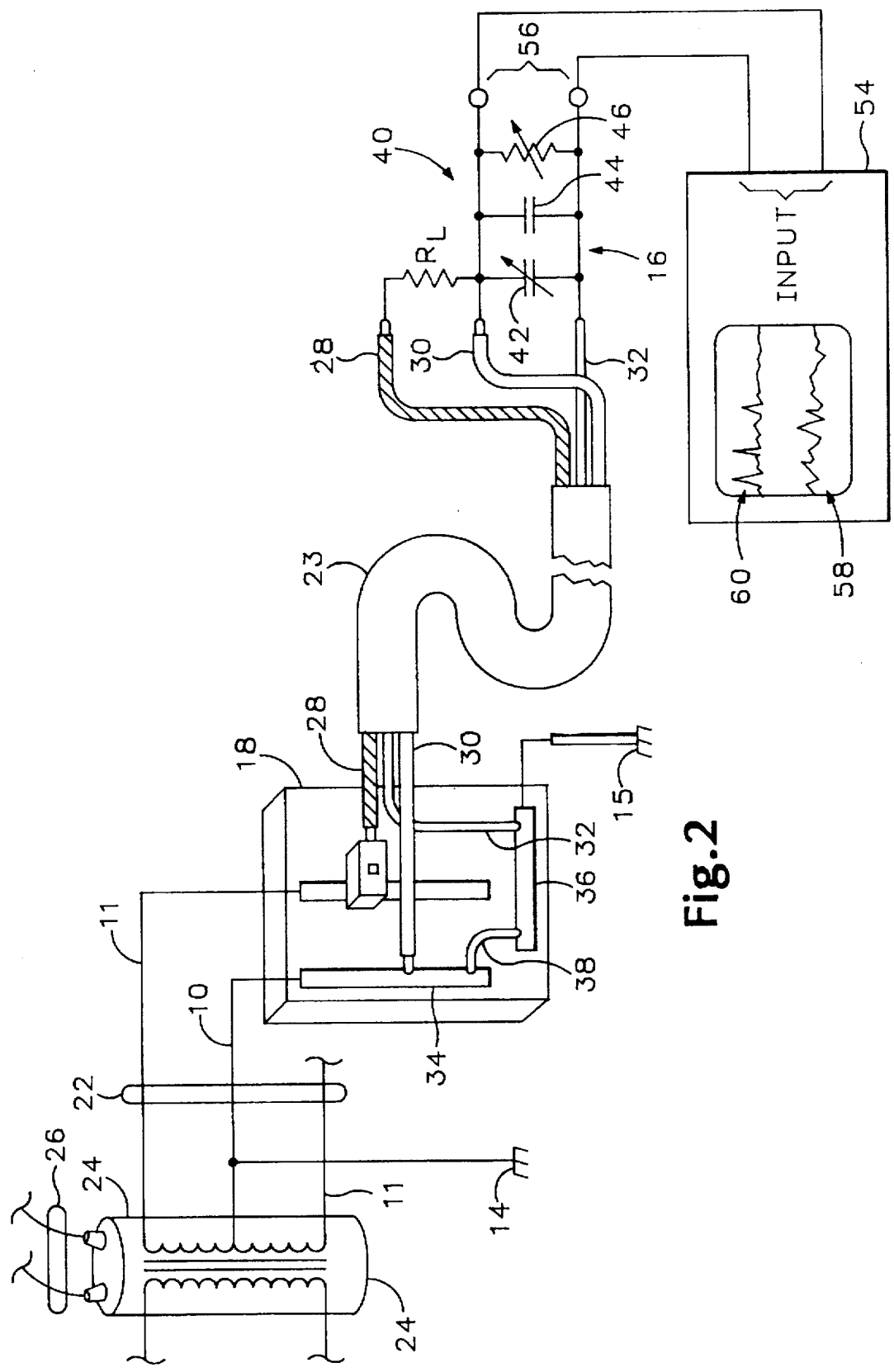
FIG. 2 is a schematic diagram of a preferred embodiment of a resonant circuit and ISF signal identification system according to the present invention.

Referring to FIGS. 1 and 2, a preferred embodiment of an ISF resonant circuit according to the present invention comprises an electrical power distribution line 26, which is part of an electric power distribution system including a power "grid," a power transformer 24, a service drop 22, power cables 23 within a structure 20, and a reactive element 16 connected to a power cable 23.

The service drop 22 includes a neutral conductor 10 and at least two hot conductors 11. The neutral conductor 10 is grounded at end 12 by earth ground 14 and at end 13 by earth ground 15. End 13 ordinarily terminates at a service box 18 attached to the structure 20, such as a house or other building. One or more power cables 23 for respective power circuits within the structure 20 are connected at the service box 18 to the neutral conductor 10 of the service drop 22 and to one of the hot conductors 11 of the service drop 22. The power cables 23 include a hot wire 28, connected to a hot conductor 11 at the service box 18, a neutral wire 30, connected to a neutral conductor 10 at the service box 18, and a ground wire 32. The neutral wire 10 of the service drop 22 is connected to a neutral bus bar 34 within the service box 18. The ground wire 32 of the power cable 23 within the structure 20 is connected to a ground bus bar 36. The neutral bus bar 34 and the ground bus bar 36 are connected together by a jumper 38.

A load impedance, represented by resistor $R_L$ is applied between the hot wire 28 and the neutral wire 30. In practice, that load impedance represents one or more electrical devices connected to the circuit represented by power cable 23. The overall impedance of the load impedance may, in reality, be primarily resistive, primarily inductive or primarily capacitive. At some point along the power cable 23 a reactive element is connected from the neutral wire 30 to the ground wire 32. Ordinarily the reactive element 16 is connected to the neutral and ground wires 30 and 32 at an AC power outlet. The load represented by $R_L$ ordinarily comprises one or more devices also plugged into AC power outlets. Ordinarily, to produce a resonant circuit, the reactive element 16 is a capacitor. The tuning component 40 comprises one or more capacitors 42 and 44 and a resistor 46. Preferably capacitor 42 is variable, so as to select the resonant frequency of the circuit, and the resistor 46 is variable so as to adjust the Q of the circuit. The capacitor 44 preferably is fixed, so as to enable capacitor 42 to provide relatively fine adjustment of the resonant frequency. It has been found that, with a total capacitance of C1, provided by capacitor 44 and capacitor 42, in the range of 1.5 µF to 12 µF and shunt resistance represented by resistor 46 of about 1000 ohms, the circuit can be tuned to ISF signals of about 1 to 10 Hz. Assuming a frequency of 7.8 Hz, which has been found to be associated with tectonic activity, and a capacitance C1 of 5 µF, the inductance provided by the power distribution system is about 530 H.

Figure 3:
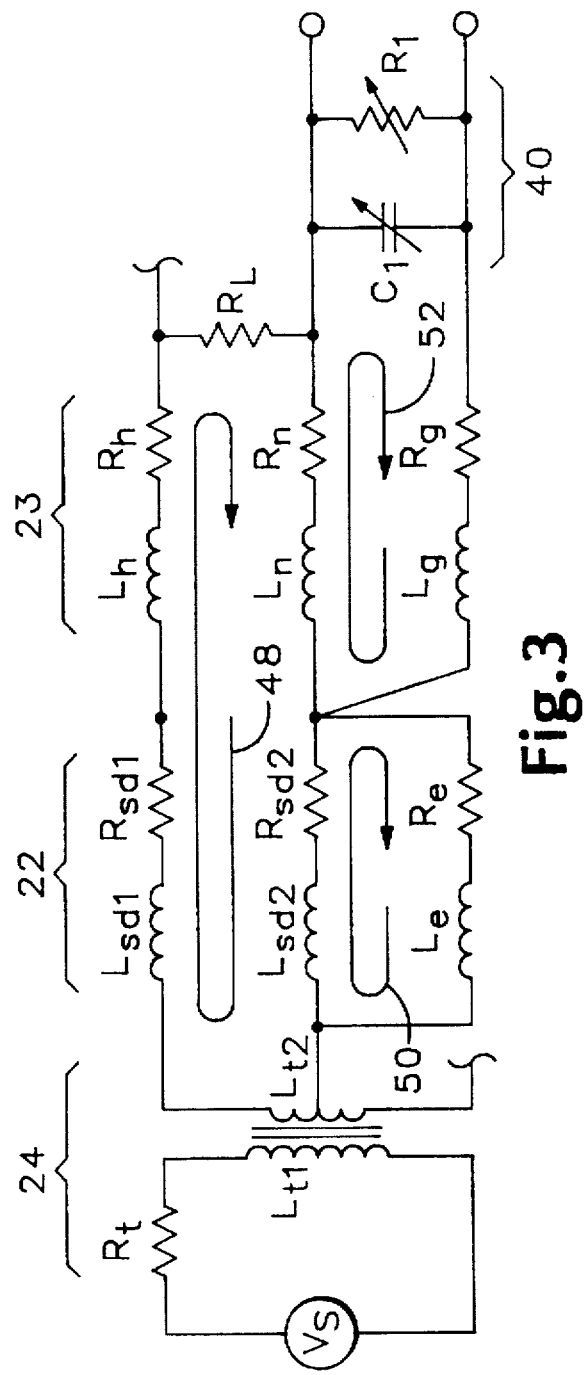
FIG. 3 is a schematic diagram of a useful circuit model of a resonant circuit according to the present invention.

While the exact source of the predominantly inductive reactance found to be provided by the power distribution system is not known, the circuit model shown in FIG. 3 is believed likely to be representative of the resonance circuit, and provides a useful tool for understanding the circuit. In that circuit model, ISF signals induced on power distribution lines are represented by signal source $V_r$. The power transformer is represented by resistance $R_t$ and mutually coupled inductors $L_{p1}$ and $L_{p2}$, $L_{p1}$ being the primary winding and $L_{p2}$ being the secondary winding of the power transformer 24. The service drop 22 is represented by inductor $L_{sd1}$ and resistor $R_{sd1}$ for the hot conductor 11, and inductor $L_{sd2}$ and resistor $R_{sd2}$ for the neutral conductor 10. $L_e$ and $R_e$ represent the impedance of the ground return path between earth ground 14 and earth ground 15, that is, the impedance of the earth itself. The power cable 23 within the structure is represented by $L_h$ and $R_h$, for the hot wire 28, inductor $L_n$ and resistor $R_n$ for the neutral wire 30, and inductor $L_g$ and resistor $R_g$ for the ground wire 32. Thence, it can be seen that the signal represented by $V_S$ is coupled through the power transformer 24 to circuit loop 48 comprising one-half the secondary winding of power transformer 24, the respective impedances of the hot conductor 11 and hot wire 28, the respective impedances of the neutral conductor 10 and neutral wire 30, and the load impedance $R_L$. The current through circuit loop 48 generates a potential across the impedance of neutral conductor 10, that is, $L_{sd2}$ and $R_{sd2}$, thereby producing current in circuit loop 50 through $L_e$ and $R_e$. Current in circuit loop 48 also produces a potential across the impedance of neutral wire 30, that is, conductor $L_n$ and resistor $R_n$, which produces current in circuit loop 52. Thence, the resonant frequency of the circuit is affected by all of the inductances combined, including the relatively high inductance of the power transformer 24.

Returning to FIG. 2, a spectrum analyzer 54 preferably is connected to the output 56 of the resonant circuit so as to identify and evaluate ISF signals present in the resonant circuit. The spectrum analyzer 54 typically provides a display having a time domain trace 58 and frequency domain trace 60. It has been found that, for ISF frequencies, these traces are especially useful for correlating ISF signal patterns with known tectonic activity because of the visceral representation they present.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A resonant circuit electrically connected to a power distribution system said resonant circuit, comprising: a first electrical cable having a first electrical conductor having a characteristic impedance, a second electrical conductor having a characteristic impedance and a third electrical conductor having a characteristic impedance, said cable further having a first end and a second end, a first electrical termination connected to said first electrical conductor at said first end of said cable, said third electrical conductor being electrically connected to said second electrical conductor at said first end of said cable, a second electrical termination connected to said first electrical conductor and said second electrical conductor at said second end of said cable, and a reactive element electrically connected to said second electrical conductor and said third electrical conductor at said second end of said cable, said reactive element having a reactance selected so that said circuit is tuned to a selected frequency, for receiving infrasonic frequency signals induced on the power distribution system.

2. The resonant circuit of claim 1, wherein said first electrical termination comprises a second electrical cable having a first electrical conductor having a characteristic impedance, a second electrical conductor having a characteristic impedance, a first end and a second end, and a third electrical termination connected to said second electrical cable at said first end thereof, said first electrical conductor of said second electrical cable being connected to said first electrical conductor of said first electrical cable at said second end of said second electrical cable and said second electrical conductor of said second electrical cable being connected to said second electrical conductor of said first electrical cable at said second end of said second electrical cable.

3. The resonant circuit of claim 2, further comprising an electrically conductive element, having a characteristic impedance, connected to said second electrical conductor from said first end to said second end of said second electric cable.

4. The resonant circuit of claim 3, wherein said electrically conductive element comprises the earth.

5. The resonant circuit of claim 3, further comprising a spectrum analyzer connected to said second and third electrical conductors of said first electrical cable at said second end thereof to identify electrical signals in said resonant circuit.

6. The resonant circuit of claim 5, wherein said reactive element comprises a capacitor.

7. The resonant circuit of claim 2, wherein said third electrical termination comprises a transformer having a primary winding and a secondary winding, said secondary winding being connected to said first and second electrical conductors of said second electrical cable at said first end thereof, and a fourth electrical termination connected to said primary winding of said transformer.

8. The resonant circuit of claim 7, wherein said first electrical cable comprises an electrical power line within a structure, said second electrical termination comprises a load connected to said electrical power line so as to obtain electrical power therefrom, said second electrical cable comprises an electrical power service drop, and said fourth electrical termination comprises an electrical power distribution system.

9. The resonant circuit of claim 8, wherein said reactive element comprises a capacitor.

10. The resonant circuit of claim 9, wherein said capacitor comprises a variable capacitor.

11. The resonant circuit of claim 10, further comprising a resistor connected to said first and second electrical conductors of said first electrical cable at said second end thereof.

12. The resonant circuit of claim 11, wherein said resistor comprises a variable resistor.

13. The resonant circuit of claim 8, further comprising a spectrum analyzer connected to said second and third electrical conductors of said first electrical cable at said second end thereof to identify electrical signals in said resonant circuit.

14. The resonant circuit of claim 1, wherein said reactive element comprises a capacitor.

15. The resonant circuit of claim 14, further comprising a resistor connected to said second and third electrical conductors of said first electrical cable at said second end thereof.

16. The resonant circuit of claim 15, wherein said resistor comprises a variable resistor.

17. The resonant circuit of claim 1, further comprising a spectrum analyzer connected to said second and third electrical conductors of said first electrical cable at said second end thereof to identify electrical signals in said resonant circuit.

18. The resonant circuit of claim 17, wherein said reactive element comprises a capacitor.

19. The resonant circuit of claim 1, further comprising a spectrum analyzer connected across said reactive element for identifying electrical signals in said resonant circuit.

20. A method for receiving ISF electromagnetic signals, comprising:

connecting a capacitor from the neutral wire to the ground wire of an AC power cable within a structure so as to produce a resonant circuit having an infrasonic frequency band; and obtaining an ISF signal across said neutral wire and said ground wire.

21. A system for identifying naturally occurring infrasonic electromagnetic signals, comprising; a resonant circuit have a selected infrasonic frequency band, said resonant circuit being coupled to an electric power distribution system for receiving the naturally occurring infrasonic electromagnetic signals associated with tectonic activity, and a spectrum analyzer coupled to said resonant circuit.

22. A method for identifying naturally occurring infrasonic frequency electromagnetic signals comprising:

coupling a resonant circuit to an electric power distribution system for reception of infrasonic frequency electromagnetic signals associated with tectonic activity;

tuning said resonant circuit to an infrasonic frequency band;

connecting a spectrum analyzer to said resonant circuit; and using said spectrum analyzer to identify frequency components of electric signals present in said resonant circuit so as to identify said infrasonic frequency electromagnetic signals.

\* \* \* \* \*